Feb. 24, 1959 M. P. GAHLMAN 2,874,859
BALE UNLOADING DEVICE FOR VEHICLES
Filed May 1, 1956 3 Sheets-Sheet 2

INVENTOR.
MAURICE P. GAHLMAN
BY
PARKER & CARTER
ATTORNEYS

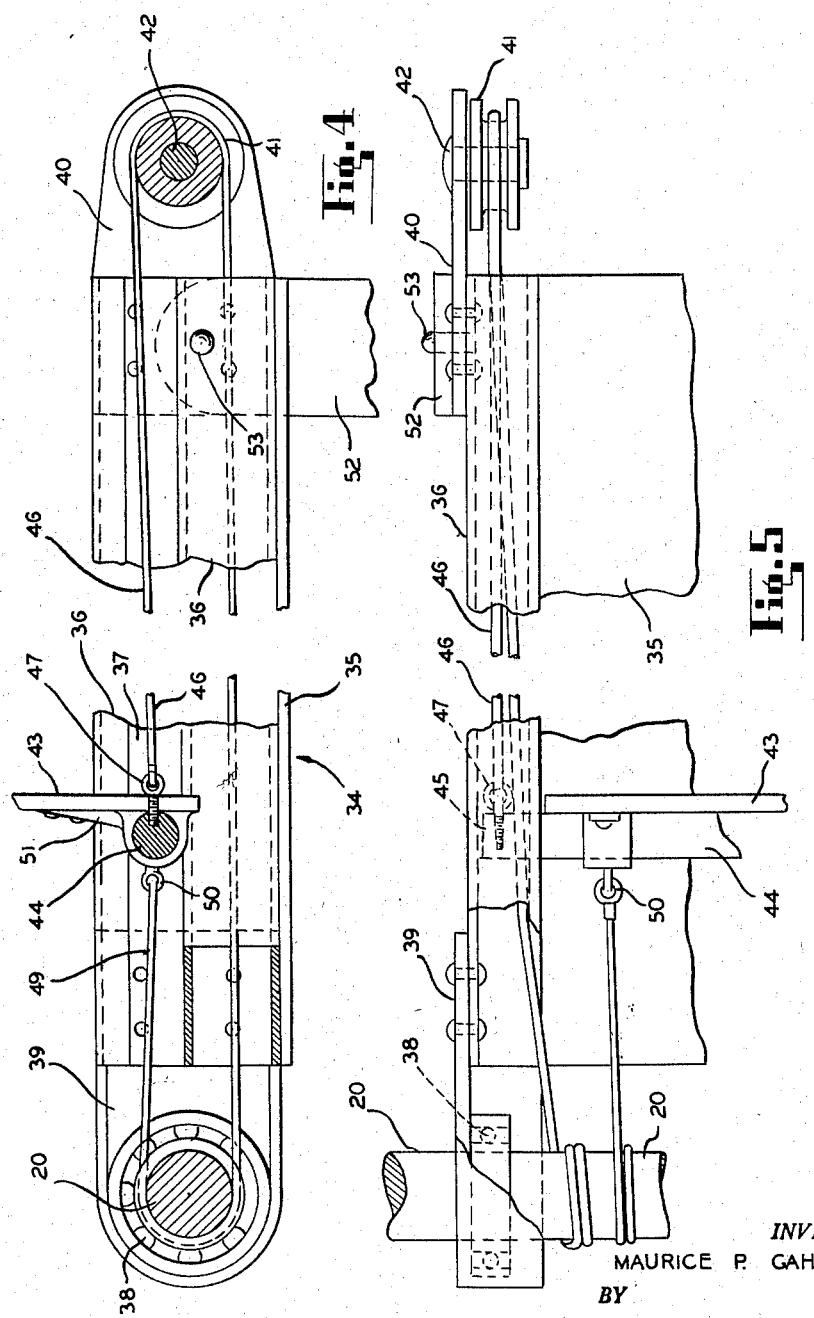

United States Patent Office 2,874,859
Patented Feb. 24, 1959

2,874,859

BALE UNLOADING DEVICE FOR VEHICLES

Maurice P. Gahlman, Theresa, Wis.

Application May 1, 1956, Serial No. 581,971

10 Claims. (Cl. 214—83.22)

My invention relates to a mechanical unloading device, and more particularly to a vehicle employed for transporting baled hay, or the like, having mechanical means for unloading the bales to a conveyor or the like.

When transporting baled hay or the like from the field, it is oftentimes necessary to haul the load quite some distance, and after the load reaches its destination, it requires an equal amount of labor to unload as it did to load. The apparatus of the present invention makes it possible to load with ease, and also unload mechanically onto a conventional conveyor for stacking.

The prime object of my invention is to provide a vehicle with a plurality of horizontal platform assemblies one above the other, and equipped with means for unloading the bales from one platform at a time onto a conventional conveyor.

Another object of my invention is to provide a device of the character described embodied in a trailer that may be transported by and actuated from a conventional tractor.

Still another object of my invention is to provide a device equipped with a clutch arrangement for unloading one platform at a time, and in which the platforms are hingedly supported at one end to permit them to be raised into an "out of the way" position when empty, and returned to a horizontal compact relation for loading.

A further object of my invention is to provide a device of the character described, in which each horizontal platform is equipped with a pusher plate which can be moved in one direction when unloading, and moved in the opposite direction to a loading position by the same actuating means.

Other and further objects of my invention will become more apparent as the description proceeds, when taken in conjunction with the drawings, in which—

Figure 4 is an enlarged detail longitudinal section of one of the platforms, with parts broken away, showing the slideable mounting of its pusher blade and the cable means for actuating said blade; and Figure 5 is a fragmentary top view of a portion of the assembly shown in Figure 4.

Figure 1:
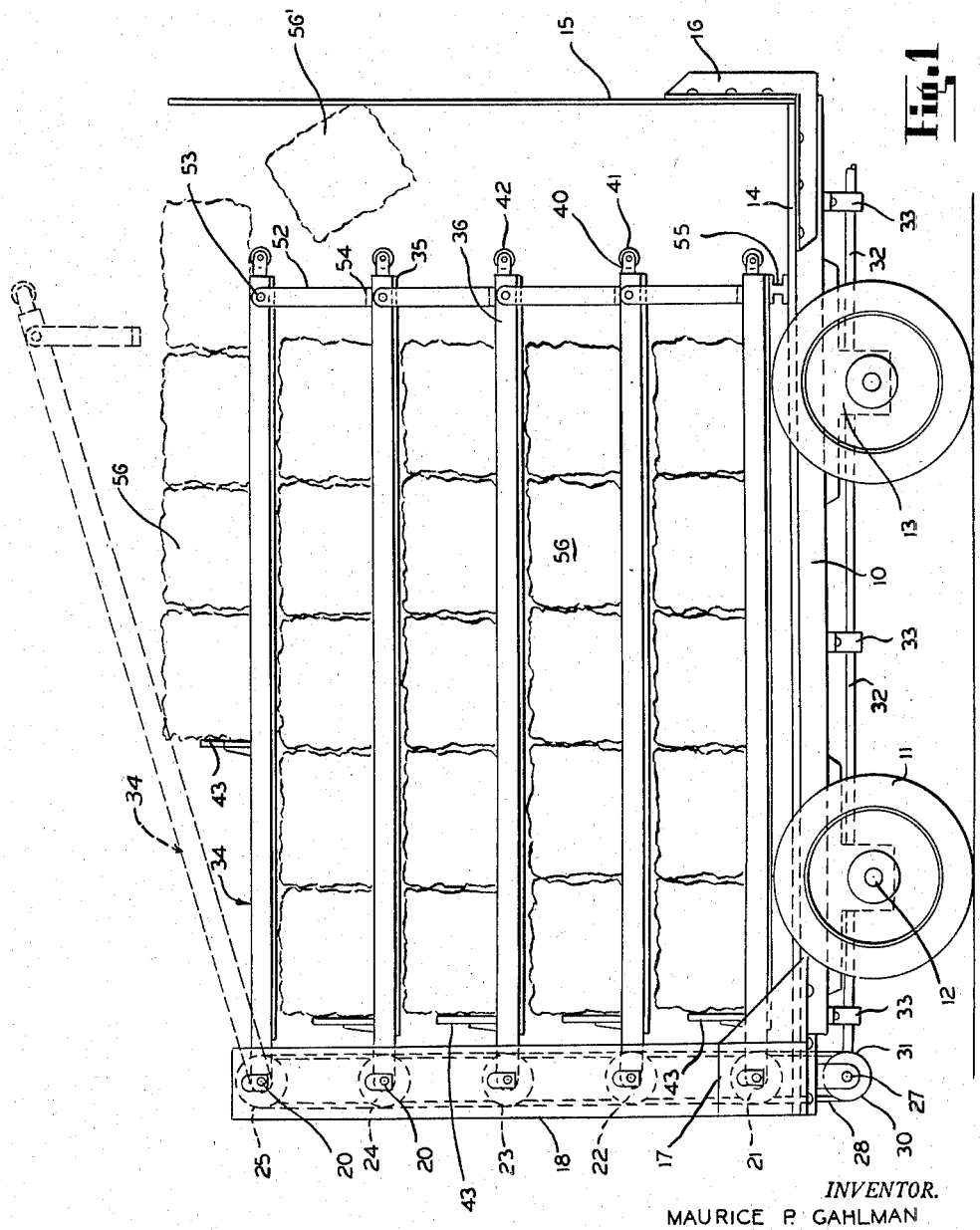
Figure 1 is a side view of a trailer device made in accordance with my invention.
Figure 2:
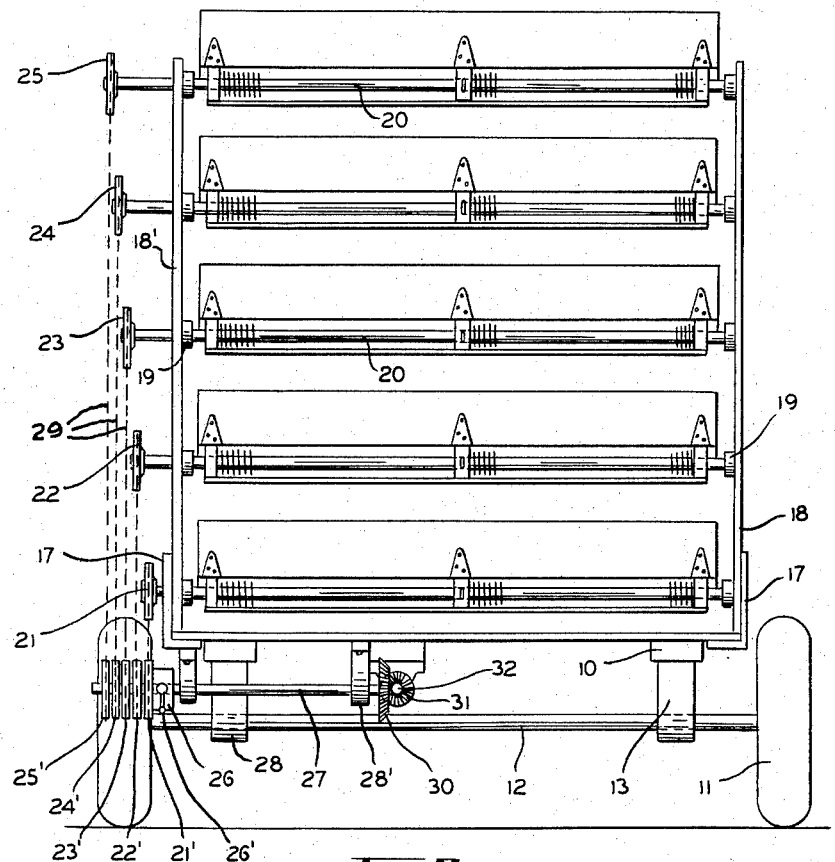
Figure 2 is a rear view of the trailer shown in Figure 1.

Similar characters of reference indicate corresponding views, and parts, and referring now to the same, the character 10 indicates generally a trailer frame or chassis. This chassis may be constructed of wood or metal, and has wheels 11 on axles 12, supported by bearings 13 in any conventional and efficient manner. A tongue or the like (not shown) may be attached to the forward end of the trailer, for engagement with a tractor (not shown) which furnishes the motive power for hauling the trailer, and actuating the mechanism thereof.

On the top surface of the frame 10 of the trailer is a flat horizontal plate 14. Extending upward at the front of said plate is a vertically disposed guide plate 15 attached to the frame 10 by angle iron brackets 16, or in any other convenient manner. The guide plate 15 extends laterally across the entire front of the trailer, and vertically to a level above the platforms on the latter, which will presently be described.

At the rear end of the trailer are a pair of vertical supports 18 and 18' connected thereto. These supports have vertically spaced pairs of bearings 19 in which shafts 20 are suitably journaled, as by ball bearing assemblies (not shown).

The ends of shafts 20 project outward beyond the vertical support 18', and each has a sprocket indicated at 21, 22, 23, 24 and 25, which are respectively in alignment with sprockets 21', 22', 23', 24' and 25' carried on and driven from a clutch 26 on a shaft 27. The respective sets of sprockets are operatively connected by chains 29.

The shaft 27 is journaled in bearings 28 and 28' attached to the under face of the frame 10. The shaft has a bevel gear 30 fixed thereon meshing with a bevel gear 31 fixed on the end of a drive shaft 32 supported by a plurality of bearings 33 attached along the frame 10. The front end of drive shaft 32 is connected to a conventional power take-off shaft on the tractor (not shown), so as to revolve the shaft 27 and the clutch 26, said clutch being of any conventional type adapted for selective actuation of the shafts 20 one at a time, as by manipulating a control handle 26'.

A plurality of vertically spaced horizontal platform assemblies 34 having flat plates 35 are supported by side rails 36.

Figure 3:
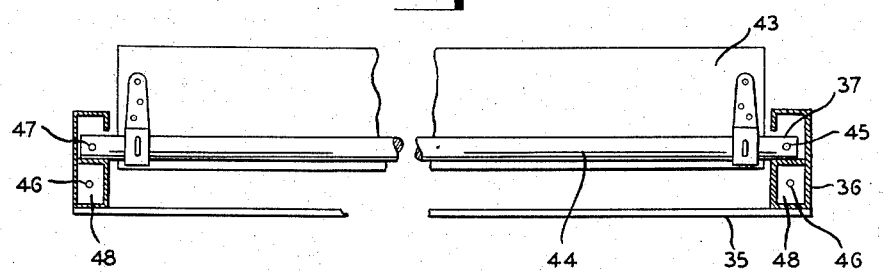
Figure 3 is an enlarged fragmentary view of one of the pusher blades showing its relation to a platform and the side rail members of the latter which are shown in cross-section.

The rails 36 are channeled as shown in cross-section in Figure 3, and have a longitudinal slot 37 extending along their inner faces. The rear end of each rail 36 has a bearing 38 disposed in an end member 39 attached to the rail 36, which bearing 38 encircles the shaft 20 as shown in Figures 4 and 5. The front end of each side rail 36 has an end piece 40 attached thereto, which acts as a bearing for pulley 41 rotatably mounted on a pin 42, attached to the end piece 40.

The rails 36 spaced above the frame 10 have standards 52, hingedly attached at 53 to the end piece 40. These standards 52 are bent at 54 to contact the top surface of the rail 36 thereby supporting the forward end of the rail 36. The bottom rail 36 adjacent the chassis plate 14 is supported by a rest member 55, attached to the latter.

Each of the horizontal platform assemblies 34 has a pusher plate 43, mounted on a bar 44 and extending laterally from one rail 36 to the other. The bars 44 are longer than the pusher plates 43, and have their outer ends 45 slideably engaged in the open slots 37 on the inner faces of the rails 36.

Cables 46 are attached at 47 to the opposite ends 45 of the bar 44 and pass over the pulleys 41. Each cable 46 extends rearward within the enclosure 48 of the rails 36 and encircles the shaft 20, to which the other end of the cable 46 is attached.

Other cables 49 are attached at 50 to the supports 51 of the pusher plate 43. Each of these cables 49 have their other end attached to and encircling the shaft 20 in opposite relation to the adjacent cable 46, so that when the shaft 20 is revolved in one direction, it will cause the cables 46 to pull the pusher plate 43 forwardly toward the pulley 41, and when the shaft 20 is revolved in the other direction, it will cause the cables 49 to pull the pusher plate 43 backward to the loading position.

The entire assembled vehicle 10 of my invention is preferably, but not necessarily, in the form of a trailer which may be transported by a tractor or the like. As shown herein, the trailer has a plurality of horizontal platform assemblies 34, each of which is hingedly attached to a shaft 20, journaled in bearings on the vertical supports 18 and 18', so as to permit each platform assembly to be swung upwardly into an "out-of-the-way" position as shown in dotted outline in Figure 1. Thus, the bottom platform 34 may be loaded first by stacking the bales of hay 56 thereon, with its pusher plate 43 being positioned at the extreme end of the assembly as shown in Figure 1. In this manner one platform after another may be lowered and loaded with bales 56, until all of the platforms are loaded.

When it is desired to unload the bales, the top sprocket or pulley 25 is revolved by the sprocket 25' on the clutch shaft, causing the top shaft 20 to revolve, winding the cable 46 around the shaft 20 and pulling the plate 43 forward, thereby pushing the bale 56 off the front end of the top platform to the position shown at 56' in Figure 1, from whence it falls by gravity, guided by the vertical guide plate 15, onto any type of conventional conveyor (not shown), the loading end of which may be inserted laterally between the guide plate 15 and the adjacent platforms. This unloading operation is repeated until all the platforms are emptied.

By reversing the clutch mechanism 26 (or by reversing the power take-off of the tractor), shafts 20 will be revolved in the opposite direction thereby pulling the pusher plates 43 rearward to their initial loading positions shown in Figure 1.

Although I have shown and described a certain embodiment of my invention, it will be understood that various changes and modifications may be made without departing from the spirit and scope of the invention as defined by the appended claims.

I claim:

1. In a vehicle of the character described, a frame, an upright support at one end of said frame, a plurality of vertically spaced, normally horizontal storage and loading platforms each having its end pivotally mounted on said upright support to permit superposed platforms to be swung upwardly from a lower platform while the latter is being loaded, pusher means reciprocably mounted on each of said platforms, and drive means on said vehicle frame having operative connection with each of said pusher means.

2. The structure of claim 1 wherein the pusher means is operable to unload material at the free end of each platform and an upright guide plate is mounted on the frame in spaced relation from the free ends of said platforms for directing the unloaded material downwardly as it drops by gravity from said platforms.

3. The structure of claim 1 wherein each of the pivotally supported loading platforms has a depending support at its free end adapted to engage the next lower platform when in horizontal loading position.

4. The structure of claim 1, wherein the pivotal support at one end of each loading platform includes a drive shaft concentric with its pivotal axis, and the operative connection between the drive means and the pusher means on each platform includes means for driving said drive shaft.

5. The structure of claim 3, wherein the pusher means on each of said platforms includes a pusher plate guided for movement along its platform, and cable means is connected between the drive shaft and the pusher plate for moving the latter to unload material at the free end of said platform.

6. The structure of claim 4, wherein the drive means on the frame is selectively connectible with the drive shafts on the several platforms for actuating their respective pusher plates.

7. The structure of claim 5, wherein the drive means on the frame is also selectively reversible for moving the several pusher plates in opposite directions.

8. The structure of claim 7, wherein the reversible drive connections for each pusher plate includes two sets of cables connected to the plate and extending in opposite directions, the two sets of cables being guided on their platform with their ends wound in opposite directions around the drive shaft of their platform.

9. The structure of claim 8, wherein each platform includes a pair of side bars with inwardly opening guide slots therealong, and the pusher plate has laterally projecting guide members slideably mounted in said guide slots.

10. The structure of claim 9, wherein the side bars have hollow portions for guiding the ends of the cables connected to the pusher plate.

References Cited in the file of this patent

UNITED STATES PATENTS

| | | |
|---|---|---|
| 1,088,980 | Goble | Mar. 3, 1914 |
| 2,427,114 | Arnett | Sept. 9, 1947 |
| 2,503,129 | Pautz | Apr. 4, 1950 |
| 2,513,696 | Veldhuizen | July 4, 1950 |
| 2,605,912 | Small et al. | Aug. 5, 1952 |
| 2,676,721 | Hansen | Apr. 27, 1954 |
| 2,679,941 | Roesies | June 1, 1954 |
| 2,761,578 | Brownlee et al. | Sept. 4, 1956 |